United States Patent [19]

Voss

[11] Patent Number: 4,773,126

[45] Date of Patent: Sep. 27, 1988

[54] HINGE ARRANGEMENT

[75] Inventor: Gerhard Voss, Hemsbach, Fed. Rep. of Germany

[73] Assignee: Deere & Company, Moline, Ill.

[21] Appl. No.: 34,199

[22] Filed: Apr. 6, 1987

[30] Foreign Application Priority Data

Jul. 17, 1986 [DE] Fed. Rep. of Germany ....... 3624095

[51] Int. Cl.[4] ............................ E05F 1/14; B60P 7/02

[52] U.S. Cl. ........................................ 16/288; 16/291; 16/294; 16/370; 296/100

[58] Field of Search ................. 16/287, 288, 291, 294, 16/302, 370; 296/76, 106, 100, 57 A, 56

[56] References Cited

U.S. PATENT DOCUMENTS 1,621,500 3/1927 Fitch .................................... 16/287

FOREIGN PATENT DOCUMENTS 0007104 10/1981 European Pat. Off. .
1467870 12/1966 France .
654766 6/1951 United Kingdom .

*Primary Examiner*—Nicholas P. Godici
*Assistant Examiner*—Edward A. Brown

[57] ABSTRACT

An over-center, two-link hinge mechanism which can be made of simple off-the-shelf components has a hinged part pivotally mounted to a bar spaced apart from a frame. Two pivotally connected links connect the hinged part and the frame in front of the hinged part pivot point. A pre-tensioned volute spring connects an interlink pivot pin with the frame behind the hinged part pivot point. Two hinge mechanisms can be used back-to-back, in which case the pin connecting the link to the frame for one hinge can serve as an attachment point for the spring of the other hinge, and vice-versa.

7 Claims, 2 Drawing Sheets

HINGE ARRANGEMENT

BACKGROUND OF THE INVENTION

1. Field of the Invention

The invention concerns a hinge arrangement for a hinged part that can be held in either a first or a second position by an energy storage device which is attached to a stationary bearing.

2. Description of the Related Art

French patent No. 1,467,870 teaches a two-link over-center hinge mechanism which must be placed on the side of a hinged part towards which the hinged part will swing. This is undesirable if this means the hinge must be placed on the outside surface of the hinged part, e.g., on the outside of a container with a hinged top.

Great Britain patent Specification No. 654,766 teaches a two-link over-center hinge mechanism which is placed entirely in front of the pivot point for a hinged part, thereby consuming otherwise usable space. In addition, the hinge structure requires a plate attached to a surface, e.g., a cupboard shelf, adjacent to the hinged part, and thus cannot be used if there is no such adjacent surface.

The over-center hinge arrangement of European patent No. 0 007 104 relies on a torsion bar spring, one end of which is pivoted from a stationary bearing while the other end is pivoted from the hinged part. The torsion bar is most highly deflected, and hence most highly stressed, when the hinged part is in a position intermediate to the end positions. As soon as the hinged part moves past this dead center position, the energy storage device will push the hinged part to one of the end positions. This hinge arrangement has the disadvantage that its energy storage device must be specially formed, which results in an unfavorable cost situation.

SUMMARY OF THE INVENTION

The present invention provides a double lever mechanism with a first lever pivoted between the hinged part and a link pin, and a second lever pivoted between the link pin and a first bearing. A pre-tensioned energy storage device, e.g., a volute spring, is connected between the link pin and a second bearing.

Optionally, a second hinge mechanism can be used adjacent to the first. The first bearing of the second hinge then can serve as the second bearing of the first hinge, and vice-versa. This very simple structure permits the use of off-the-shelf links and energy storage components which can be manufactured at low cost.

BRIEF DESCRIPTION OF THE DRAWINGS

The drawings illustrate an example of the invention described in further detail below.

DETAILED DESCRIPTION OF THE PREFERRED EMBODIMENTS

Figure 1:
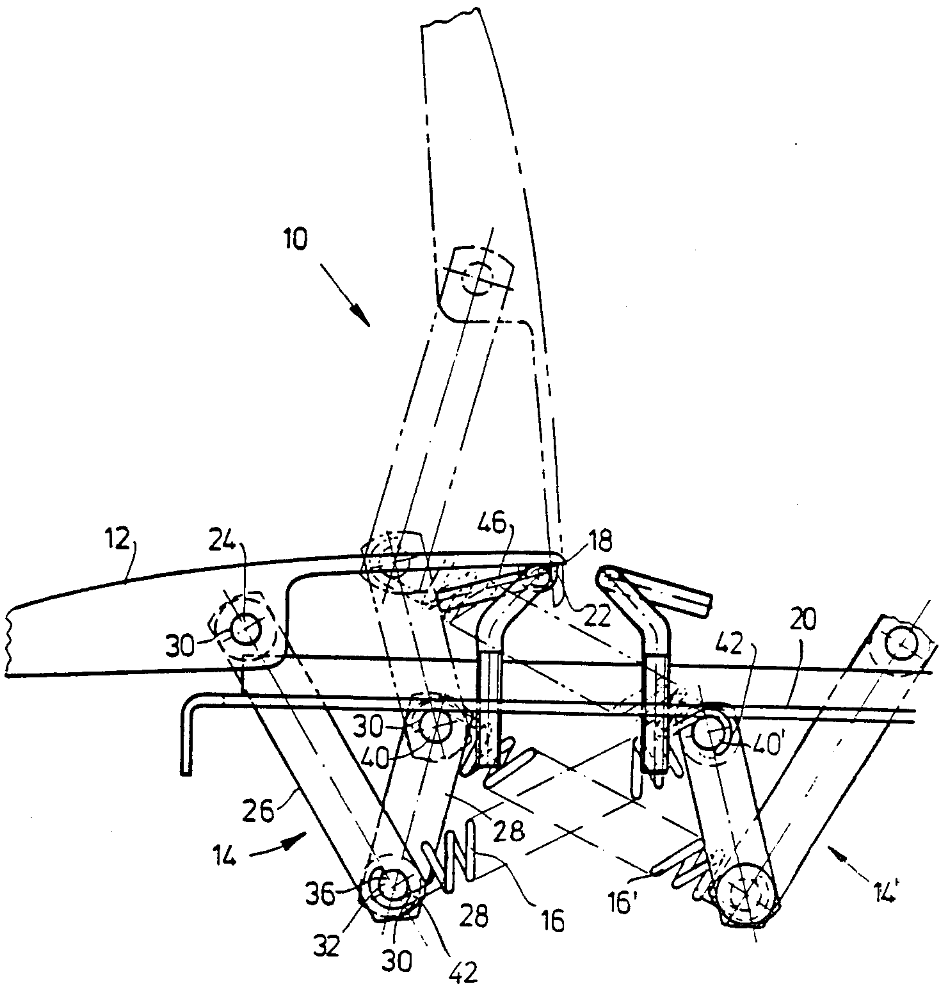
FIG. 1 is a side view of a hinge arrangement according to the invention.

FIG. 1 shows a hinge arrangement 10 for a hinged part 12 which includes a double lever mechanism 14 and an energy storage device 16. A second double lever mechanism 14' and energy storage device 16', which are provided for a second hinged part (not shown), will not be described in further detail since they are configured as a mirror image to the initial double lever mechanism 14 and energy storage device 16.

The hinged part 12 may be an equipment cover, an engine hood, a swinging door or similar cover. It is suspended by a U-shaped stirrup bracket 18 attached to a frame 20. The hinged part 12 is pivoted on the bracket 18 by means of two eyes 22. For sake of clarity, a bracket 18' also is shown for the second hinged part. A pin 24 (discussed below) is attached to the hinged part 12 some distance from the eyes 22.

Figure 2:
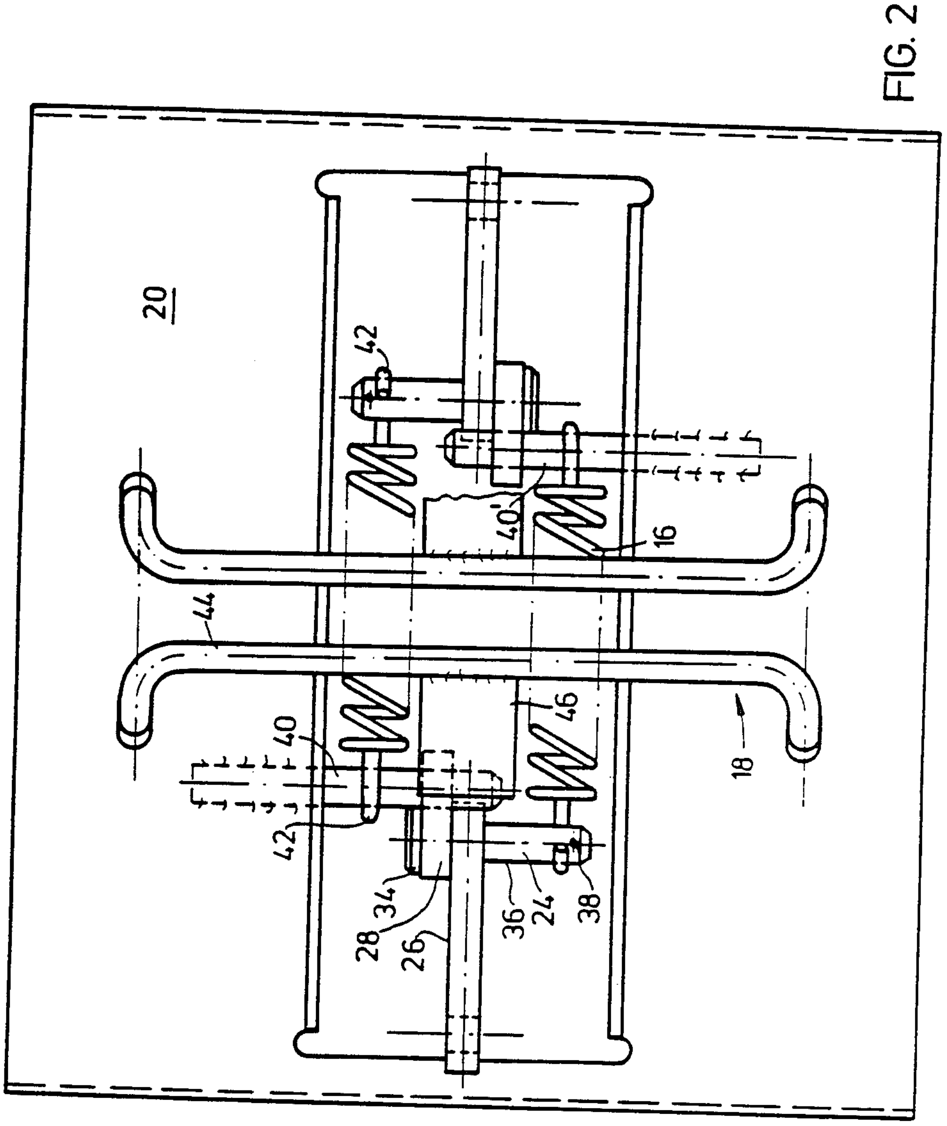
FIG. 2 is a plan view of the hinge arrangement of FIG. 1, except that the hinged part has been omitted for reasons of clarity.

The double lever mechanism 14 has a long lever 26 and a short lever 28, each of which has holes 30 at both ends. The levers 26, 28 are made from commercial flat steel bar and hence may be manufactured at very low cost. A link 32 connects the two levers 26, 28 through two of the holes 30. As best seen in FIG. 2, the link is formed by a pivot pin with a hub 34 and a necked portion 36 which protrudes beyond the levers 26, 28 so the neck can accept a cotter pin, retaining pin or similar device 38. Referring again to FIG. 1, a bearing 40 is attached to the frame 20 and may be a pin, a screw or any similar component. The long lever 26 is pivoted through one end hole 30 about the pin 24 and through the other end hole about the link 32, while the short lever 28 is pivoted about the bearing 40 and the link 32.

As can be seen, the angle between the long and the short levers 26, 28 changes with the position of the hinged part 12. The longitudinal centerlines of the two levers 26, 28 are very nearly on a line when the hinged part 12 is in its upper end position, indicated in dashed lines. In this upper end position, the link 32 is located above the bearing 40 while in the lower end position, shown in solid lines, the link 32 is below the bearing 40.

The energy storage device 16 is shown in this example as a volute extension spring. It may also be a gas pressurized spring, a volute compression spring, a leaf spring or any similar device. It extends from the link 32 to the bearing 40' for a second hinged part. Attachment eyes 42 are provided at each end, one surrounding the necked portion 36 of the link 32, the other surrounding the bearing 40'. The attachment eye 42 at the link end 32 is positioned on the necked portion 36 of the link 32, between the long lever 26 and the cotter pin 38 (see FIG. 2). The energy storage device 16 is installed in such a way that it is pre-tensioned in each end position of the hinged part 12. If a second hinged part is not used, the bearing 40' serves only for the attachment of the other end of the energy storage device 16.

Finally, as shown in FIG. 2, a stop 46 extends from the central bar 44 of the bracket 18 towards the double lever mechanism 14 and consists of a simple flat steel clip welded to the bracket 18. The length of the stop 46 determines the upper end position of the hinged part 12. The lower end position of the hinged part 12 results from its contact with the frame 20. The stop 46 could be omitted if the double lever mechanism 14 were to contact the central bar 44 directly.

The short lever 28, the energy storage device 16 and the connection between bearings 40, 40' form an unequal triangle whose longest side is formed by the energy storage device 16. During the movement of the hinge arrangement 10, only the side of the triangle formed by the energy storage device 16 varies in length. In the dead center position, the longitudinal centerlines of the sides of the then distorted triangle are coincident in one line. In this position, the tension in the energy storage device 16 is at a maximum, with the result that the double lever mechanism 14 is propelled towards one of its end positions with the maximum force of the energy storage device 16 as soon as the dead center position is passed.

As shown in FIG. 1, the hinged part 12 is in contact with the frame 20 in its lower end position. In this position, both the link 32 and the line of action of the energy storage device 16 are located below the bearing 40 so that the hinged part 12 is moved downward by means of the long lever 26. At this point, the short lever 28 assumes the function of a support. If the hinged part 12 is to be brought into its other end position, it will be rotated upward about the bracket 18, that is, in a clockwise direction with reference to FIG. 1. The steadily increasing force of the energy storage device 16 must be overcome during this motion. The energy storage device 16 simultaneously rotates about the bearing 40' and reaches a line between the bearings 40, 40'. In this position, the energy storage device 16 can only move the short lever 28 in the direction of the bearing 40 since the short lever 28 no longer forms a moment arm with respect to the bearing 40 and the line of action of the energy storage device 16. As soon as the double lever mechanism 14 has passed this dead center position, both the link 32 and the line of action of the energy storage device 16 will be above the bearing 40, and will impel the hinged part 12 to its upper end position. Movement ends when the short lever 28 makes contact with the stop 46. Since the energy storage device 16 is still operating upon the double lever mechanism 14 in this upper end position due to its pretension, the hinged part 12 is retained in the end position. The process of the movement from the upper to the lower end position is analogous to the above.

As noted earlier, the second hinged part (not shown) can be similarly hinged, in which case the second energy storage device 16' is attached to the bearing 40. Otherwise, the assembly of the second hinge arrangement for the second hinged part is identical to that for the first hinged part 12.

I claim:

1. An over-center two-link hinge mechanism for pivotally connecting a hinged part to a support means, the hinged part having a closed position adjacent to the support means, comprising:

first pivot means mounted to the support means and pivotally supporting the hinged part at a location radially spaced from the support means;

second pivot means on said hinged part radially spaced from said first pivot means further than said hinged part is spaced radially from said support means;

third pivot means on said support means longitudinally between said first and said second pivot means when said hinged part is in its closed position;

fourth pivot means on said support means longitudinally on the opposite side of said first pivot means from said third pivot means;

first link means pivotally mounted to said second pivot means;

second link means pivotally mounted to said third pivot means;

fifth pivot means pivotally interconnecting said first and second link means; and pre-tensioned energy storage means connecting said fourth and fifth pivot means.

2. The hinge mechanism of claim 1, wherein said first link means is longer than said second link means.

3. The hinge mechanism of claim 1, further comprising:

a second hinged part having a closed position adjacent to said support means;

sixth pivot means mounted to said support means and pivotally supporting said second hinged part at a location radially spaced from said support means and longitudinally adjacent to said first hinged part;

seventh pivot means on said second hinged part radially spaced from said sixth pivot means further than said second hinged part is spaced radially from said support means;

third link means pivotally mounted to said seventh pivot means;

fourth link means pivotally mounted to said fourth pivot means;

eighth pivot means pivotally interconnecting said third and fourth link means; and a second pre-tensioned energy storage means connecting said third and eighth pivot means.

4. The hinge mechanism of claim 3, wherein said first hinged part, first, second, third and fifth pivot means, said first and second link means and said first energy storing means are substantially indentical to said second hinged part, said sixth, seventh, fourth and eighth pivot means, said third and fourth link means and said second energy storage means, respectively.

5. An over-center two-link hinge mechanism for pivotally connecting a hinged part to a frame, the hinged part having a closed position adjacent to the frame, comprising:

a bar mounted to the frame and about which the hinged part is pivotally mounted at a pivot location spaced from said frame in a radial direction relative to a pivot axis of said hinged part;

a first pivot pin mounted to said hinged part at a point thereof radially spaced from said hinged part pivot location further than said hinged part pivot location is spaced radially from said frame;

a first pivot bearing mounted to said frame at a point along said frame longitudinally between said hinged part pivot location and said first pivot pin when said hinged part is in the closed position;

a second pivot bearing mounted to said frame at a point along said frame longitudinally on the opposite side of said hinged part pivot location from said first pivot bearing;

a first link pivotally mounted at one end thereof to said first pivot pin;

a second link, shorter than said first link, pivotally mounted at one end thereof to said first pivot bearing;

a second pivot pin pivotally connecting another end of said first link to another end of said second link; and a pre-tensioned volute spring connected between said second pivot bearing and said second pivot pin.

6. The hinge mechanism of claim 5 further comprising:

a second hinged part, a second bar and a third pivot pin connected to each other and the frame adjacent and in mirror image to the first hinged part, first bar and first pivot pin, respectively;

a third link pivotally mounted at one end thereof to said third pivot pin;

a fourth link, shorter than said third link, pivotally mounted at one end thereof to said second pivot bearing;

a fourth pivot pin pivotally connecting another end of said third link to another end of said second link; and a second pre-tensioned volute spring connected between said first pivot bearing and said fourth pivot pin.

7. The hinge mechanism of claim 6, wherein said first hinged part, first and second pivot pins, first pivot bearing, first and second links and first spring are substantially identical to said second hinged part, third and fourth pivot pins, second pivot bearing, third and fourth links and second spring, respectively.

* * * * *